United States Patent [19]

Sockell

[11] Patent Number: 4,954,323
[45] Date of Patent: Sep. 4, 1990

[54] AOG INCINERATOR $NO_x$ EMISSION CONTROL VIA $NH_3$ INJECTION

[75] Inventor: Edward J. Sockell, Port Lavaca, Tex.

[73] Assignee: The Standard Oil Company, Cleveland, Ohio

[21] Appl. No.: 265,739

[22] Filed: Nov. 1, 1988

[51] Int. Cl.$^5$ ............................................. C01B 21/00
[52] U.S. Cl. .................................................... 423/235
[58] Field of Search .................... 423/235, 235 D, 239, 423/239 A

[56] References Cited

U.S. PATENT DOCUMENTS

| | | | |
|---|---|---|---|
| 4,131,432 | 12/1978 | Sato et al. | 423/239 |
| 4,285,923 | 8/1981 | Bean et al. | 423/385 |
| 4,316,878 | 2/1982 | Atune et al. | 423/235 |
| 4,756,890 | 7/1988 | Tang et al. | 423/235 |

Primary Examiner—Gregory A. Heller
Attorney, Agent, or Firm—Michael F. Esposito; David J. Untener; Larry W. Evans

[57] ABSTRACT

A process and apparatus for the reduction of NO in combustion effluent comprising injecting $NH_3$ into contact with the combustion effluents wherein the improvement comprising injecting the $NH_3$ into the combustion effluent through a venturi used to connect the incinerator means which produces the combustion effluent to the cooling means which cools the combustion effluent prior to emission into the atmosphere.

6 Claims, 1 Drawing Sheet

AOG INCINERATOR NO$_x$ EMISSION CONTROL VIA NH$_3$ INJECTION

BACKGROUND OF THE INVENTION

The present invention relates to a non-catalytic method for reducing the concentration of NO in combustion effluents by the injection of ammonia into the effluent stream the apparatus for carrying out the injection. In particular, the present invention is directed to the reduction of NO in combustion effluents produced by incineration of absorber off gas streams found in chemical plants such as in acrylonitrile plants by the injection of ammonia into the effluents stream at a temperature below 1375° F.

Combustion effluents and waste products from various installations are a major source of air pollution when discharged into the atmosphere. One particular troublesome pollutant found in many combustion effluents streams is NO$_2$, a major irritant in smog. Furthermore, it is believed that NO$_2$ in the presence of sunlight and hydrocarbons undergoes a series of reactions known as photochemical smog formation. The major source of NO$_2$ is NO which to a large degree is generated at such stationery installations such as gas and oil fired steam boilers for electric power plants, process heaters, incinerators, coal fired utility boilers, glass furnaces, cement kilns, and oil field steamed generators.

Various methods have been developed for reducing the concentration of nitrogen oxides in combustion effluents. One such method which has been developed was a non-catalytic thermal deNO$_x$ method discloced in U.S. Pat. No. 3,900,554 assigned to Exxon Research & Engineering Company. The process disclosed in the patent shows the reduction of NO$_2$ by injecting ammonia into the combustion effluents stream. This basic procedure was subsequently further refined as set forth in U.S. Pat. Nos. 4,115,515, 4,507,269, 4,636,370 and 4,624,840 also assigned to Exxon. These patents are directed to non-catalytic method for reducing the concentration of NO in combustion effluents by (1) injection of ammonia into combustion effluents which are maintained at a high temperature or (2) injection ammonia into the combustion effluent at a location determined by solving a specific kinetic equation.

The present invention is directed to an improvement in these methods and a novel apparatus which allows for the injection of the ammonia at a substantially lower temperature than that utilized in these patents without the need for solving the complex kinetic equation.

SUMMARY OF THE INVENTION

It is the primary object of the present invention to provide a novel process and apparatus for the non-catalytic reduction of the concentration of NO in combustion effluents.

It is another object of the present invention to provide a novel procedure and apparatus for reducing NO content of combustion effluents produced by incinerating the absorber off gas stream obtained from an acrylonitrile chemical plant.

Additional objects, advantages and novel features of the invention will be set in part in the description which follows, and in part will become apparent to those skilled in the art upon examination of the following or may be learned by practice of the invention. The objects and advantages of the invention may be realized and obtained by means of the instrumentalities and combinations particularly pointed out in the appending claims.

To achieve the forgoing and other objects of the present invention as embodied and broadly described herein, the apparatus of this invention comprises a means for incineration, a cooling means for the combustion effluent, and a means for injecting ammonia into said combustion effluent, wherein the improvement comprises connecting the means for incineration, the means for cooling, and the means for injecting ammonia one to the other by the use of a a single connecting means which increases the velocity of the effluent as it passes from the incineration means through the connecting means to the cooling means at the point where the ammonia is injected into the effluent.

In a further aspect of the practice of the present invention, the apparatus comprises a means for incineration to produce the combustion effluent, a means for cooling the combustion effluent and a means for injecting ammonia into contact with the combustion effluent wherein the improvement comprises connecting the means for inceneration to the means for cooling by means of a venturi which also contains a receiving means connected to the means for injecting ammonia.

In accordance with a further aspect of the present invention there is provided a process for the non-catalytic reduction of NO in a combustion effluent which comprising contacting ammonia or a compound capable of producing ammonia upon vaporization at an elevated temperature with the NO containing combustion effluent to reduce the NO content of the combustion effluent wherein the improvement comprises increasing the flow velocity of the combustion effluent prior to contacting with the ammonia or compound capable of producing ammonia.

In a preferred embodiment of this aspect of the present invention the temperature of the combustion effluent contacted with the ammonia or compound capable of producing ammonia upon vaporization is no greater than 1375° F.

In accordance with a further preferred aspect of the present invention, there is provided a process for non-catalytically reducing the concentration of NO in a combustion effluent by means of injecting ammonia into contact with the effluent wherein the improvement comprises injecting the ammonia into contact with the effluents through an opening in a venturi which connects the means for incineration to produce the combustion effluent to the means for cooling the combustion effluent.

The term "venturi" as defined in Webster's Ninth New Collegiate Dictionary means a short tube with a tapering constriction in the middle that causes an increase in the velocity of flow of a fluid and a corresponding decrease in fluid pressure. It should be understood that any channel which functions in the same manner as a venturi is envisioned as useful in the practice of the present invention. While not being limited to any particular theory it is believed that the increase in flow velocity of the fluid (i.e. combustion effluent) as it passes through the venturi results in an increase in turbulence at the point where the ammonia is injected into the stream thereby resulting in a more efficient mixing of the ammonia with the effluent enabling the ammonia to reduce the NO content of the combustion effluent by greater 50% and, in fact, between 60–80%, preferably 70–80% at a temperature which is less than 1375° F.

DETAILED DESCRIPTION OF THE INVENTION

Figure 1:
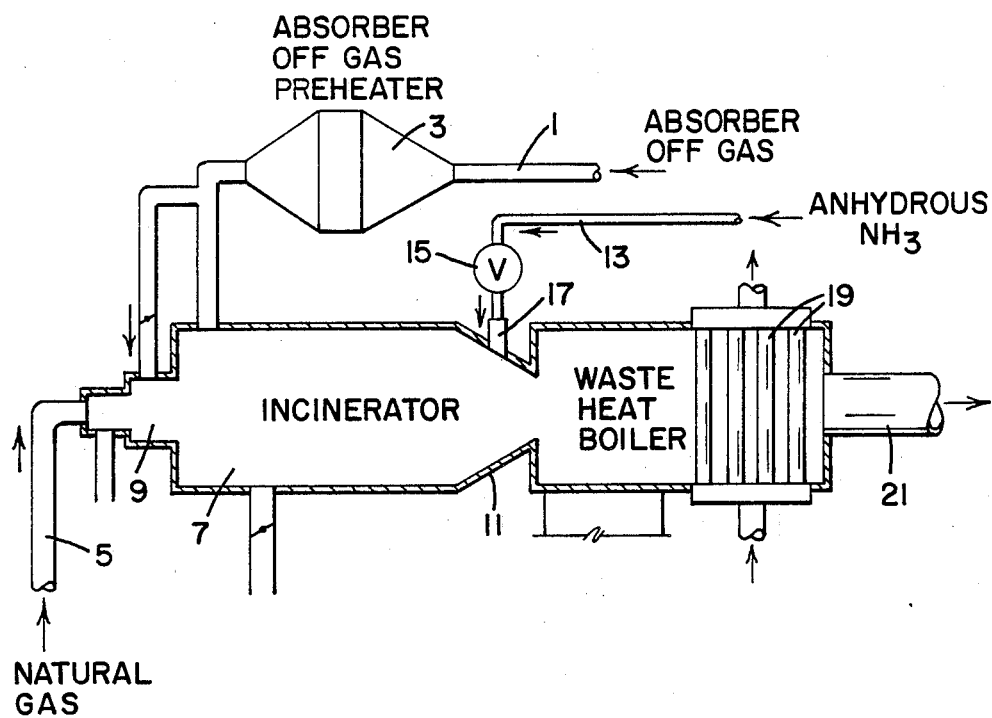
FIG. 1 is a flow diagram of a combustion apparatus useful in the practice of the present invention.

Combustion is usually affected in the stationery combustion equipment such as a boiler, furnace and incinerators in a section of the equipment commonly referred to as a firebox. Generally this is accomplished by igniting a suitable fuel, in presence of air, with one or more burners. Materials other than conventional fuels can, however, be combusted in the firebox portion of the equipment which is generally the case when combustion is effected in an incinerator. In any event, the principle combustion products are carbon dioxide and steam and those products along with the other combustion products such as carbon monoxide and the various oxides of nitrogen and sulfur, combined with any excess oxygen and unconverted nitrogen to form what is referred to herein a combustion effluent. Usually, the combustion effluent also contains about 0.1–20 volume percent oxygen, preferably 0.1 to 11 volume percent.

The temperature of the combustion effluent is usually at a maximum near the point of combustion (i.e. firebox) and decreases axially (along the flow path) and radically (outwardly) as the effluent moves along its flow path from the point of combustion until its is emitted to the atmosphere. In this regard, it should be appreciated that the maximum change in temperature will occur along the path of flow of the effluent when the effluent is contacted with heat exchange equipment (i.e. cooling means) which usually occurs in the convection section of the combustion apparatus. It has been discovered by applicants in the practice of the present invention that $NO_x$ reduction can be easily attained by injecting the ammonia into the combustion effluent through an opening in a connecting means (e.g. a venturi) located between the incinerator means and the means for cooling the effluent.

The connecting means located between the means for incineration and the convection section (i.e. cooling means) of the combustion apparatus is designed to increase the velocity of flow of the effluent as it passes from the means for incineration to the convection section of the combustion apparatus. For example, the connecting means can be a short tube provided with a tapered constriction in the middle which causes the increase in the velocity of the flow of the effluent.

The amount of ammonia or ammonia producing compound used herein can readily be determined by those skilled in the art (see for example U.S. Pat. No. 3,900,554) Normally the range is from about 0.4–10- moles, preferably 0.5–3 moles of ammonia per mole of NO. The minimum required is at least one mole of ammonia per mole of NO to be removed.

The reaction may be carried out at pressures from about 0.1 atmospheres to 100 atmospheres. The velocities of the combustion effluents as well as the mixing of the ammonia and the post combustion zone are regulated so that there is an effective residence time at the temperature where the ammonia is contacted with the combustion effluents. It has been found that by injecting the ammonia into contact with the combustion effluents at the point where the combustion effluents pass through the venturi from the incinerator to the cooling means, results in a substantial reduction of $NO_x$ at a temperature which is below 1375° F., preferably below 1360° F., and especially preferably at a temperature of about 1350° F. or below.

In still another embodiment ammonia is stored prior to use in a form other than pure substance and is employed as a precursor. Useful forms of ammonia include its solution in water, ammonium carbonate, ammonium formate and ammonium oxalate. Moreover, the ammonia may be injected into the system with the combination of an inert diluent such as steam, nitrogen helium or the like.

The practice of the present invention enables one to effectively reduce the $NO_x$ in a combustion effluent without having to solve a complex kinetic equation to determine the specific point to inject the ammonia into the system as is taught in U.S. Pat. Nos. 4,507,269, 4,624,840 and 4,636,370. Moreover, the process of the present invention is performed at a temperature below 1375° F. most preferably at temperatures of below 1360° F. and especially preferred is a temperature of about 1350° F. and the $NH_3$ is injected into the combustion effluent when the effluents are at substantially constant temperature. That is, ammonia is injected into contact with the combustion effluent allowing for a contact time 0.4–0.5 seconds prior to entry into the convection section (cooling zone or tubes) of the combustion apparatus. Typically, the ammonia is injected into the system about 30–35 feet prior to the cooling tubes. It is particularly important to note that although the practice of the present invention takes place at an extremely low temperature there is absolutely no need for the addition of other reducing materials such as hydrocarbons, $H_2$ and/or CO to the combustion effluent.

With reference to FIG. 1, the apparatus and process of the present invention will now be described in detail.

Absorber off gas produced in an industrial acrylonitrile plant is fed via line 1 into the absorber off gas preheater 3 to be preheated to the desired temperature necessary for incineration. Natural gas is fed via line 5 into incinerator 7 where it is contacted with absorber off gas in the firebox area 9 of incinerator 7. At this point the absorber off gas obtained from the acrylonitrile plant containing the contaminants to be incinerated is ignited with the natural gas forming a combustion effluent containing NO. The combustion effluent travels through the incinerator 7 into venturi 11 where the velocity of the effluent increase due to the constriction in the venturi. Ammonia is passed into contact with the combustion effluent via line 13 which is connected to venturi 11 via receiving means 17. Valve 15 is positioned along line 13 to control the flow of ammonia into venturi 11. The temperature of the combustion effluent passing through the venturi 11 at this point is typically below 1375° F., in particular below 1360° F. and more especially preferred at 1350° F. The combustion effluent after contact with ammonia are further passed upstream into cooling means (convection section) where the effluents are cooled via contact with cooling tubes (19) prior to emission via line 21 into the atmosphere through an air stack (not shown). Usually, cooling means 18 comprises a waste heat boiler which allows for the recovery of waste heat from the combustion effluent prior to its passage to the air stack for emission to the atmosphere.

The foregoing description of the preferred embodiment of the present invention has been presented for purposes of illustration and description. It is not intended to be exhaustive or to limit the invention to the precise form disclosed and obviously many modifications and variations are possible in light of the above teachings. The embodiment was chosen and described in order to best explain the principles of the invention and its practical application. To one of ordinary skill in the art to best utilize the invention in various embodiments and with various modifications as are suited to the particular use comtemplated. It is intended that the scope of the invention be defined by the claims appended hereto.

What is claimed in the invention is:

1. The process for the non-catalytic reduction of the concentration of $NO_x$ from combusion effluents by means of injecting ammonia into said effluents wherein the process comprises injecting said ammonia tangentially into said effluents through an opening in a venturi, wherein said effluents are experiencing an increased flow velocity within said venturi, and wherein said venturi directly connects a means for incineration to produce said combusion effluents to a means for cooling said combustion effluents.

2. The process of claim 1 wherein said combustion effluent is produced by incineration of the absorber offgases produce in an acrylonitrile plant.

3. The process of claim 1 wherein the temperature of said combustion effluent when contacted with said ammonia is less than 1375° F.

4. The process of claim 3 wherein the temperature of said combustion effluent when contacted with said ammonia is 1350° F.

5. A process for the non-catalytic reduction of NO in a combustion effluent comprising contacting said NO containing effluent with ammonia or a compound capable of producing ammonia at the temperature of said effluent wherein the process comprises increasing the flow velocity within a venturi of said effluent prior to contacting said effluent tangentially with said ammonia or ammonia compound and wherein the temperature of the combustion is maintained at below about 1375° F. during contact with said ammonia.

6. The process of claim 5 wherein said temperature is about 1350° F.

* * * * *